Sept. 20, 1927.  
M. P. HOLMES  
SPROCKET  
Filed March 8, 1924

1,642,856

Inventor:  
Morris P. Holmes.  
by  
Attorney.

Patented Sept. 20, 1927.

1,642,856

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

SPROCKET.

Application filed March 8, 1924. Serial No. 697,940.

This invention relates generally to sprockets for mining machines and more particularly to a sprocket and sprocket bearing for a cutter chain used thereon.

It is an object of this invention to provide an improved sprocket and more particularly an improved chain sprocket especially adapted to use with mining machine cutter chains. A further object is to provide an improved sprocket bearing. A still further object is to provide improved means for accomplishing the previous object, and also positioning the sprocket while at the same time rendering the sprocket bearing dust proof.

In the accompanying drawings I have shown for purposes of illustration one form which my invention may assume in practice.

In these drawings,—

In this illustrative construction I have shown my invention used in connection with a usual cutter bar 1 of a mining machine which employs a cutter chain 2 guided at the forward end of the cutter bar as by an idler sprocket 3 rotatably mounted within a suitable bearing structure to be described. It will, however, of course be understood that my invention may be used in connection with a sprocket located at either end of the chain or bar.

Figure 1:
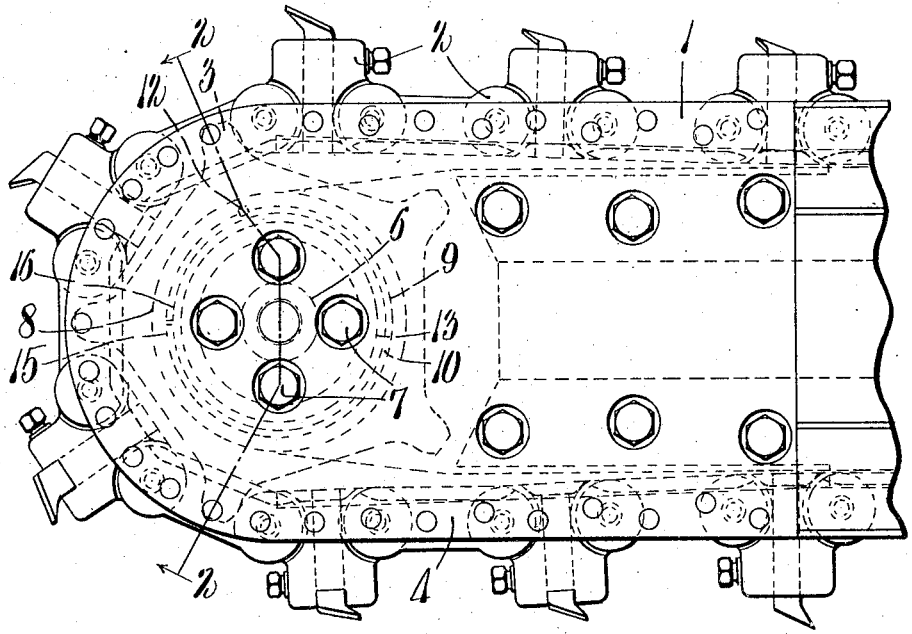
Fig. 1 is a fragmentary plan view of the forward portion of a cutter bar embodying my invention.
Figure 2:
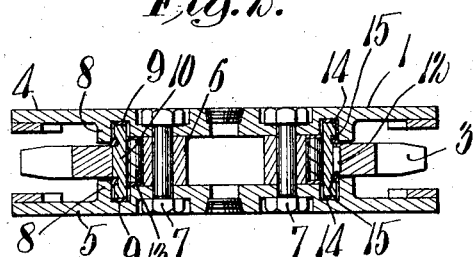
Fig. 2 is a developed transverse section on line 2—2 of Fig. 1.
Figure 3:
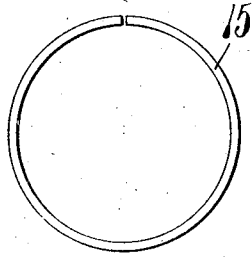
Fig. 3 is a detail view of one of the locking rings.
Figure 4:
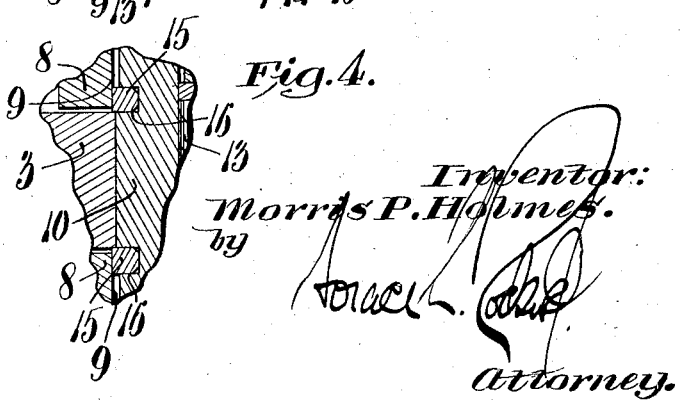
Fig. 4 is an enlarged detail of the relation of the locking ring to the sprocket and bearing therefor.

The cutter bar 1 is shown as comprising upper and lower plates 4 and 5 which are spaced at their forward end by an inner annular bearing member 6 through which bolts 7 pass to hold said bearing member and plates 4 and 5 in rigid relation. Projecting inwardly from the plates 4 and 5 are annular members 8 adapted to form annular recesses 9 within which is disposed an outer bearing member 10 having an original tight fit with the sprocket 3 keyed thereto as by a key 12, roller bearings 13 being disposed between the inner and outer bearing members 6 and 10 respectively. Disposed within the annular recesses 9 and at the ends of the bearing 10 are bearing rings 14 upon which the weight of the sprocket or other downward and upward forces will bear. In order to prevent dirt or other foreign material from gaining access to the bearings 13 I have provided a suitable dust proof structure comprising locking rings 15 seated within recesses 16 disposed adjacent the outer ends of the annular portions 8 and, being of resilient material, they will bear against members 8 and thereby prevent dirt from passing inwardly from the exterior thereof. It is to be noted that the inner edges of the members 15 are beveled so as to allow the same to be easily inserted within their respective grooves 16 without necessitating the thorough cleansing of these grooves. It is also to be noted, that as clearly shown in Fig. 4, the outer bearing member 10 is spaced slightly inwardly from the inner wall of the members 8, thereby letting the locking rings project outwardly beyond the periphery of the member 10 and thus be adapted to engage a portion of the sprocket 3. It will thus be seen that by my improved locking ring construction the tendency of the sprocket after long use to slip down and ride upon the surface of the member 8 is prevented, as the locking ring engages part of the sprocket and thereby prevents dropping and consequent excessive wear of the sprocket, the whole of the thrust being carried by the lower bearing member 14.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a support providing an annular groove, a rotatable member having an annular flange rotatably received in said groove, and ring means moving with said rotatable member resiliently engaging a lateral wall of said groove.

2. In combination, a support providing an annular groove, a rotating structure comprising an annular flange rotatively received in said groove, and ring means carried by said rotating structure resiliently engaging the outer lateral wall of said groove.

3. In combination, a support providing an annular groove, floating ring means in the bottom of said groove, a rotatable structure comprising an annular flange rotatably received in said groove and engaging said floating ring means, and ring means carried by said rotatable structure resiliently engaging the outer lateral wall of said groove.

4. In combination, spaced supports having annular grooves, a sprocket having annular flanges projecting into said grooves, ring means disposed between certain of the adjacent surfaces of said grooves and flanges, and means whereby the ends of said flanges form thrust bearing members with the bottoms of said grooves.

5. In combination, spaced supports having annular grooves, an annular member having portions rotatably received in said grooves, a sprocket on said member, and ring means supported on said member at opposite sides of said sprocket and resiliently engaging the outer walls of said grooves.

6. In combination, spaced supports having annular grooves, an annular member having portions rotatably received in said grooves, a sprocket on said member, and locking ring means supported on said member at opposite sides of said sprocket engaging the lateral surfaces thereof and the outer walls of said grooves.

7. A sprocket bearing comprising spaced plates, a sprocket having a cylindrical bearing surface, a bearing cooperating therewith, and radially expanding means associated with said plates to prevent foreign matter gaining access to said bearing.

8. A bearing structure comprising spaced inner and outer bearing members, one of said members having a radial portion thereon, and means serving both to maintain said radial portion in normal operative relation to the remaining structure and to prevent access of foreign matter to said bearing elements.

9. In combination, spaced plate members, an inner circular bearing member, means for holding said members in operative relation, an outer annular bearing member surrounding said inner member, flange means carried by said plate members coaxial with and surrounding said outer member, and means projecting from the exterior of said outer member and engaging said flange means for preventing access of abrasive material between said bearing members.

10. In combination, spaced plate members, an inner circular bearing member, means for holding said members in operative relation, an outer annular bearing member surrounding said inner member, antifriction members between said inner and outer members, flange means carried by said plate members coaxial with and surrounding said outer member, and means projecting from the exterior of said outer member and engaging said flange means for preventing access of abrasive material between said bearing members.

11. In combination, spaced plate members, an inner circular bearing member, means for holding said members in operative relation, an outer annular bearing member surrounding said inner member, antifriction members between said inner and outer members, floating rings between said outer member and said plate members, flange means carried by said plate members coaxial with and surrounding said outer member, and means projecting from the exterior of said outer member and engaging said flange means for preventing access of abrasive material between said bearing members.

12. An article of manufacture comprising a bearing ring having spaced peripheral recesses therein, and a sprocket member pressed onto said ring and positioned between said recesses.

13. An article of manufacture comprising a bearing ring having spaced peripheral recesses therein, a sprocket member pressed onto said ring and positioned between said recesses, and additional bearing and locking means disposed within said recesses to cooperate with said bearing ring.

In testimony whereof I affix my signature.

MORRIS P. HOLMES.